(12) United States Patent
Huang et al.

(10) Patent No.: US 11,967,320 B2
(45) Date of Patent: Apr. 23, 2024

(54) PROCESSING VOICE INFORMATION WITH A TERMINAL DEVICE AND A CLOUD SERVER TO CONTROL AN OPERATION

(71) Applicants: QINGDAO HAIER WASHING MACHINE CO., LTD., Shandong (CN); Haier Smart Home Co., Ltd., Shandong (CN)

(72) Inventors: Zhenxing Huang, Qingdao (CN); Sheng Xu, Qingdao (CN); Junming Yin, Qingdao (CN); Hai Shu, Qingdao (CN)

(73) Assignees: QINGDAO HAIER WASHING MACHINE CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 348 days.

(21) Appl. No.: 17/413,150

(22) PCT Filed: Nov. 26, 2019

(86) PCT No.: PCT/CN2019/120824
§ 371 (c)(1),
(2) Date: Jun. 11, 2021

(87) PCT Pub. No.: WO2020/119438
PCT Pub. Date: Jun. 18, 2020

(65) Prior Publication Data
US 2022/0028384 A1    Jan. 27, 2022

(30) Foreign Application Priority Data
Dec. 11, 2018  (CN) .......................... 201811513015.2

(51) Int. Cl.
G10L 15/30   (2013.01)
G10L 15/18   (2013.01)
G10L 15/22   (2006.01)

(52) U.S. Cl.
CPC .......... G10L 15/22 (2013.01); G10L 15/1822 (2013.01); G10L 15/30 (2013.01)

(58) Field of Classification Search
CPC ..... G10L 15/1822; G10L 15/22; G10L 15/30; G10L 2015/223; G10L 15/06;
(Continued)

(56) References Cited

U.S. PATENT DOCUMENTS 9,767,803 B1 * 9/2017 Wakeford ............... G10L 15/22
9,837,083 B1   12/2017 List
(Continued)

FOREIGN PATENT DOCUMENTS

CN    102496364 A    6/2012
CN    102708865 A    10/2012
(Continued)

OTHER PUBLICATIONS

International Search Report dated Feb. 21, 2020 in corresponding International Application No. PCT/CN2019/120824; 7 pages.

*Primary Examiner* — Martin Lerner
(74) *Attorney, Agent, or Firm* — Maier & Maier, PLLC

(57) ABSTRACT

A process of a voice control method with a cloud server and a terminal device. The voice control method includes: a terminal device receiving voice information; the terminal device querying a control instruction corresponding to the voice information from a local voice database; when the control instruction corresponding to the voice information is not queried in the local voice database, the terminal device uploading the voice information to a cloud server; the cloud server parsing the control instruction corresponding to the
(Continued)

voice information; when the control instruction corresponding to the voice information is parsed, the cloud server sending the control instruction to the terminal device; and the terminal device receiving the control instruction, and performing a corresponding operation on the basis of control instruction.

3 Claims, 5 Drawing Sheets

(58) Field of Classification Search
CPC .......... G10L 15/063; G10L 2015/0635; G10L 2015/0636
USPC .............................. 704/207, 270.1, 275, 244
See application file for complete search history.

(56) References Cited

U.S. PATENT DOCUMENTS

| | | | |
|---|---|---|---|
| 10,274,911 B2* | 4/2019 | Uppala | G10L 15/22 |
| 10,388,277 B1* | 8/2019 | Ghosh | G10L 15/22 |
| 10,565,986 B2* | 2/2020 | Kakirwar | G10L 15/1822 |
| 10,614,804 B2* | 4/2020 | Kolavennu | G10L 15/30 |
| 10,777,203 B1* | 9/2020 | Pasko | G10L 15/1822 |
| 2002/0072918 A1* | 6/2002 | White | G10L 15/30 704/270.1 |
| 2002/0138274 A1* | 9/2002 | Sharma | G10L 15/30 704/270 |
| 2018/0166068 A1* | 6/2018 | Hess | G10L 15/30 |
| 2019/0042561 A1* | 2/2019 | Kakirwar | G10L 15/22 |
| 2020/0175980 A1* | 6/2020 | Li | G10L 15/22 |
| 2021/0037067 A1* | 2/2021 | Lee | G10L 15/30 |

FOREIGN PATENT DOCUMENTS

| | | | | |
|---|---|---|---|---|
| CN | 104538034 A | | 4/2015 | |
| CN | 108510984 A | | 9/2018 | |
| CN | 108520747 A | | 9/2018 | |
| EP | 3826007 A1 | * | 5/2021 | ........... G10L 15/063 |
| GB | 2331826 A | * | 6/1999 | ........... G10L 15/187 |
| WO | 2016063158 A1 | | 4/2016 | |
| WO | WO-2017054122 A1 | * | 4/2017 | ............ G10L 15/00 |
| WO | WO-2020119437 A1 | * | 6/2020 | ............ G10L 15/30 |
| WO | WO-2021060728 A1 | * | 4/2021 | ........... G10L 15/063 |

* cited by examiner

PROCESSING VOICE INFORMATION WITH A TERMINAL DEVICE AND A CLOUD SERVER TO CONTROL AN OPERATION

FIELD

The present disclosure relates to the technical field of voice control, and in particular to a voice control method, a cloud server and a terminal device.

BACKGROUND

With the increasing improvement of people's living standards, a washing machine has become one of the indispensable household appliances in people's homes. In order to meet differentiated washing requirements of users, existing washing machines are equipped with more and more functions. Correspondingly, adjustment options for washing mode and washing parameters are also becoming more and more complicated, which undoubtedly increases the user's learning and use costs.

In order to solve the problem of increased learning and use costs caused by the increase in functions, some existing washing machines are equipped with a voice recognition module. The voice recognition module recognizes instructions spoken by the user to start corresponding washing programs, thereby avoiding complicated adjustment process of the washing mode and the washing parameters. Although the above solution simplifies the operation of the washing machine to a certain extent, the following problems inevitably exist: the existing voice recognition modules are mainly divided into offline voice recognition modules and online voice recognition modules. Although the offline voice recognition modules have a fast response speed, they can only recognize specific command keywords, and the number of keywords is often limited by a storage space. If the user wants to start a specific washing program, he/she has to accurately remember the corresponding keywords, which leads to a very bad experience. As compared with the offline voice recognition modules, the online voice recognition modules can perform semantic recognition. By uploading command sentences spoken by the user to a cloud for analyzing and parsing, the washing program required by the user can be accurately executed. However, the online voice recognition modules require that the commands be uploaded to the cloud for parsing, and the response is slow, which makes the user wait too long, so the experience is not very good.

Accordingly, there is a need for a new voice control method in the art to solve the above problem.

SUMMARY

In order to solve the above problem in the prior art, that is, to solve the problem of poor user experience in existing washing machines with a voice recognition function, the present disclosure provides a voice control method in a first aspect, the voice control method including:
  receiving voice information by a terminal device;
  querying a control instruction corresponding to the voice information from a local voice library by the terminal device;
  uploading the voice information to a cloud server by the terminal device, when the control instruction corresponding to the voice information is not found by querying in the local voice library;
  parsing the control instruction corresponding to the voice information by the cloud server;
  sending the control instruction corresponding to the voice information to the terminal device by the cloud server, when the control instruction corresponding to the voice information is parsed out; and
  receiving the control instruction by the terminal device, and performing a corresponding operation by the terminal device based on the control instruction.

In a preferred technical solution of the above voice control method, after the step of "parsing the control instruction corresponding to the voice information by the cloud server", the voice control method further includes:
  determining, by the cloud server, the number of times a mapping relationship between the voice information and the control instruction has been recorded in a cloud voice library, when the control instruction corresponding to the voice information is parsed out;
  comparing, by the cloud server, the number of times of recording with a preset number of times, if the number of times of recording is not equal to zero;
  sending, by the cloud server, the mapping relationship to the terminal device, if the number of times of recording is larger than the preset number of times; and
  receiving the mapping relationship by the terminal device, and storing the mapping relationship in the local voice library by the terminal device.

In a preferred technical solution of the above voice control method, the voice control method further includes:
  recording, by the cloud server, the mapping relationship in the cloud voice library, if the number of times of recording is equal to zero.

In a second aspect, the present disclosure provides a voice control method, which includes:
  receiving, by a cloud server, voice information uploaded by a terminal device;
  parsing a control instruction corresponding to the voice information by the cloud server;
  sending the control instruction corresponding to the voice information to the terminal device by the cloud server when the control instruction corresponding to the voice information is parsed out, so that the terminal device performs a corresponding operation based on the control instruction;
  in which the terminal device uploads the voice information when the control instruction corresponding to the voice information cannot be found by querying in the local voice library.

In a preferred technical solution of the above voice control method, after the step of "parsing the control instruction corresponding to the voice information by the cloud server", the voice control method further includes:
  determining, by the cloud server, the number of times a mapping relationship between the voice information and the control instruction has been recorded in a cloud voice library, when the control instruction corresponding to the voice information is parsed out;
  comparing, by the cloud server, the number of times of recording with a preset number of times, if the number of times of recording is not equal to zero; and
  sending, by the cloud server, the mapping relationship to the terminal device if the number of times of recording is larger than the preset number of times, so that the terminal device stores the mapping relationship in the local voice library.

In a preferred technical solution of the above voice control method, the voice control method further includes:

recording, by the cloud server, the mapping relationship in the cloud voice library, if the number of times of recording is equal to zero.

In a third aspect, the present disclosure provides a voice control method, which includes:

receiving voice information by a terminal device;

querying a control instruction corresponding to the voice information from a local voice library by the terminal device;

uploading the voice information to a cloud server by the terminal device, when the control instruction corresponding to the voice information is not found by querying in the local voice library, so that the cloud server parses the control instruction corresponding to the voice information; and receiving the parsed-out control instruction corresponding to the voice information from the cloud server by the terminal device, and performing a corresponding operation by the terminal device based on the control instruction.

In a preferred technical solution of the above voice control method, after the step of "uploading the voice information to the cloud server by the terminal device", the control method further includes:

receiving a mapping relationship between the voice information and the control instruction from the cloud server by the terminal device, and storing the mapping relationship in the local voice library by the terminal device;

in which when the cloud server has parsed out the control instruction corresponding to the voice information, the cloud server determines the number of times the mapping relationship between the voice information and the control instruction has been recorded in a cloud voice library; and the mapping relationship is sent by the cloud server when the number of times of recording is not equal to zero and is larger than a preset number of times.

The present disclosure also provides a cloud server which includes: a memory; a processor; and a computer program; the computer program is stored in the memory and is configured to be loaded by the processor to perform the voice control method described in any one of the above preferred technical solutions of the second aspect.

The present disclosure also provides a terminal device which includes: a memory; a processor; and a computer program; the computer program is stored in the memory and is configured to be loaded by the processor to perform the voice control method described in any one of the above preferred technical solutions of the third aspect.

It can be understood by those skilled in the art that in the preferred technical solutions of the present disclosure, the voice control method includes: receiving voice information by a terminal device; querying a control instruction corresponding to the voice information from a local voice library by the terminal device; uploading the voice information to a cloud server by the terminal device, when the control instruction corresponding to the voice information is not found by querying in the local voice library; parsing the control instruction corresponding to the voice information by the cloud server; sending the control instruction corresponding to the voice information to the terminal device by the cloud server, when the control instruction corresponding to the voice information is parsed out; and receiving the control instruction by the terminal device, and performing a corresponding operation by the terminal device based on the control instruction.

Through the above control method, the voice control method of the present disclosure can increase the response speed of a terminal device with a voice recognition function, and greatly improve the user experience of the user. Specifically, after receiving the voice information, the terminal device first performs a local query, and if the control instruction corresponding to the voice information is found by querying in the local voice library, the terminal device performs a corresponding operation according to the control instruction. Due to the fast response speed of the local voice library, the operation of the terminal device is performed quickly and the user experience is good. If the control instruction corresponding to the voice information is not found by querying in the local voice library, the voice information is uploaded to the cloud server for parsing, and when the control instruction corresponding to the voice information is parsed out, the cloud server sends the control instruction to the terminal device so that the terminal device performs the corresponding operation based on the control instruction. Since the cloud server can perform semantic recognition of voice, its recognition range is wide and the accuracy is high. Therefore, when the control instruction is not found by querying in the local voice library, the parsing of the voice information by the cloud server can avoid the problem of low recognition accuracy rate when only local recognition is implemented, so that the user experience is improved.

Further, the number of times the mapping relationship between the voice information and the corresponding control instruction has been recorded is determined by the cloud server, and when the number of times of recording is not equal to zero and is larger than the preset number of times, the corresponding mapping relationship is sent to the terminal device. Therefore, the terminal device stores the mapping relationship in the local voice library, so that the terminal device can also automatically update the local voice library based on the user's use habits, thus greatly improving the intelligence of the voice recognition function of the terminal device and further greatly improving the response speed of the terminal device and the user's use experience.

BRIEF DESCRIPTION OF THE DRAWINGS

The voice control method, cloud server and terminal device of the present disclosure will be described below with reference to the accompanying drawings and in conjunction with a washing machine. In the drawings.

DETAILED DESCRIPTION

Preferred embodiments of the present disclosure will be described below with reference to the accompanying drawings. It should be understood by those skilled in the art that these embodiments are only used to explain the technical principles of the present disclosure, and are not intended to limit the scope of protection of the present disclosure. For example, although the embodiments are described in conjunction with a washing machine, the application scenes of the present disclosure are not limited to this. Those skilled in the art may apply the control method of the present disclosure to other terminal devices without departing from the principles of the present disclosure, as long as the terminal devices have a voice recognition function. For example, it is obvious that the control method of the present disclosure may also be applied to refrigerators, televisions, speakers and the like which have a voice recognition function.

First Embodiment

Figure 1:
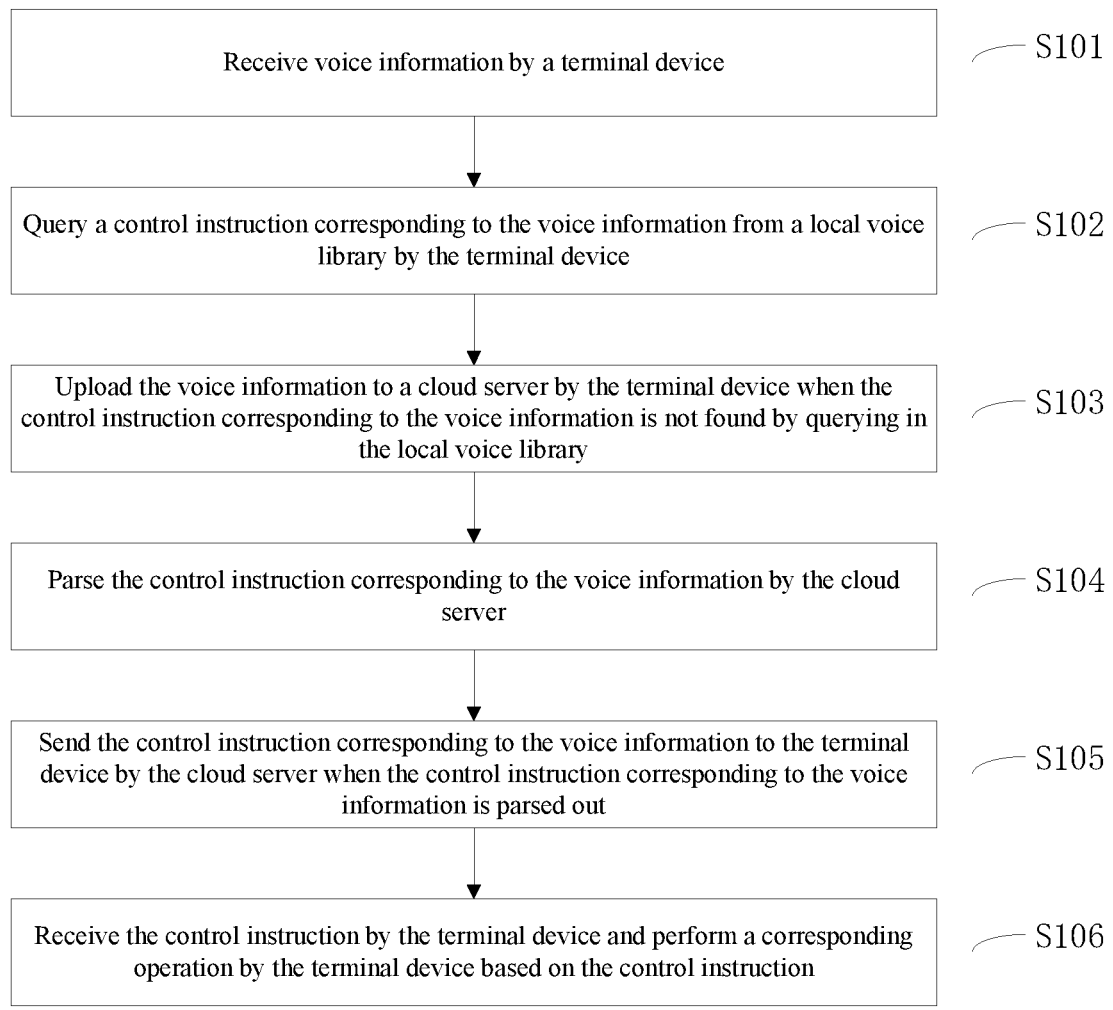
FIG. 1 is a flowchart of an embodiment of the voice control method of the present disclosure.

First, referring to FIG. 1, a first embodiment of the voice control method of the present disclosure will be described. FIG. 1 is a flowchart of an embodiment of the voice control method of the present disclosure. An execution body of this method is a washing machine and a cloud server (hereinafter referred to as "cloud"). The washing machine is provided with a control module and a voice recognition module. The voice recognition module is capable of recognizing a control instruction corresponding to voice information, and sending the control instruction to the control module when the voice information can be converted into the control instruction, so that the control module controls the washing machine to perform a corresponding operation based on the control instruction. The cloud server is also capable of recognizing the control instruction corresponding to the voice information, and the cloud server is also capable of directly communicating with the voice recognition module or indirectly communicating with the voice recognition module by communicating with the washing machine, so as to receive the voice information sent by the voice recognition module or the washing machine, and to send instruction information or a mapping relationship between the voice information and the control instruction to the voice recognition module or the washing machine, so that the washing machine can perform a corresponding operation. Similarly, in this embodiment, the form of the cloud server is not limited, and any remote server that is not locally provided can be used as the cloud server in the present disclosure.

As shown in FIG. 1, in order to solve the problem of poor user experience in existing washing machines with a voice recognition function, the voice control method of the present disclosure mainly includes the following steps S101 to S106.

S101: receiving voice information by a washing machine. For example, the voice information may be obtained through a collection element such as a microphone provided on the washing machine, or may be obtained through conversion after an audio file is received, to which this embodiment does not impose any limitation. For example, after the washing machine is turned on, the microphone is always in a turned-on state so as to obtain the voice information, or the microphone is in the turned-on state after the user presses a voice input button provided on the washing machine so as to obtain the voice information; for another example, the user inputs voice information into a mobile device (such as a mobile phone, a tablet computer, etc.), so that the washing machine receives an audio file sent by the mobile device and then converts it into the voice information.

S102: querying a control instruction corresponding to the voice information from a local voice library by the washing machine. For example, the washing machine has a local voice library stored therein, and the local voice library stores a mapping relationship between the voice information and the control instruction. After receiving the voice information, the washing machine recognizes the control instruction corresponding to the received voice information by controlling the voice recognition module to query the mapping relationship stored in the local voice library.

S103: uploading the voice information to a cloud server by the washing machine, when the control instruction corresponding to the voice information is not found by querying in the local voice library. For example, when the control instruction corresponding to the voice information is found by querying in the local voice library, the control instruction is sent to the control module, so that the control module controls the washing machine to perform a corresponding operation based on the control instruction, such as executing a washing program, a spinning program, etc. When the control instruction corresponding to the voice information is not found by querying in the local voice library, the voice recognition module or the washing machine uploads the voice information to a cloud server, so as to take advantage of the powerful processing capability of the cloud server to parse the voice information. The voice recognition module or the washing machine uploads the voice information to the cloud server in a wired or wireless manner, to which this embodiment does not impose any limitation.

S104: parsing the control instruction corresponding to the voice information by the cloud server. For example, after receiving the voice information, the cloud server performs voice and/or semantic parsing and recognition on the voice information.

S105: sending the control instruction corresponding to the voice information to the washing machine by the cloud server, when the control instruction corresponding to the voice information is parsed out. For example, if the cloud server fails to parse out the control instruction corresponding to the voice information, it can send a parsing failure instruction to the washing machine, so that the control module controls the washing machine to send prompt information after receiving the parsing failure instruction, such as sending a prompt sound prompting the user to re-enter, or controlling an indicator light to flash, etc. If the cloud server successfully parses out the control instruction corresponding to the voice information, it can send the control instruction to the washing machine so that the washing machine can perform a corresponding operation based on the control instruction.

S106: receiving the control instruction by the washing machine, and performing a corresponding operation by the washing machine based on the control instruction. For example, after the cloud server successfully parses out the control instruction and sends it to the washing machine, the control module receives the control instruction and controls the washing machine to perform a corresponding operation based on the control instruction, such as executing a washing program, a spinning program, etc.

Through the above way of control, the voice control method of the present disclosure can improve the response speed of the washing machine, and greatly improve the user's use experience. Specifically, after the washing machine receives the voice information, it first controls the voice recognition module to perform a local query. If the control instruction corresponding to the voice information is found by querying in the local voice library, the control module controls the washing machine to perform a corresponding operation according to the control instruction. Since the response speed of the local voice library is fast, the operation of the washing machine in this case is performed quickly and the user experience is good. If the control instruction corresponding to the voice information is not found by querying in the local voice library, the voice information is uploaded to the cloud server for parsing, and when the control instruction corresponding to the voice information is parsed out, the cloud server sends the control instruction to the washing machine, so that the control module controls the washing machine to perform a corresponding operation based on the control instruction. Because the cloud server has a powerful computing capability, can perform voice and semantic parsing and recognition, and has a wide recognition range and high accuracy, when the control instruction is not found by querying in the local voice library, the parsing of the voice information through the cloud server can avoid the problem of low recognition accuracy rate when only local voice recognition is performed, and the user experience is improved.

As a preferred embodiment, after step S104, the voice control method further includes the following step:

determining, by the cloud server, the number of times a mapping relationship between the voice information and the control instruction has been recorded in a cloud voice library, when the control instruction corresponding to the voice information is parsed out. For example, a cloud voice library is stored in the cloud server, and the cloud voice library stores a large number of mapping relationships between voice information and control instructions. The mapping relationships may be stored in advance, or may be generated by all users connected to the server during the use. When the control instruction corresponding to the voice information is parsed out by the cloud server, it proves that the mapping relationship between the voice information and the control instruction has been formed. After sending the control instruction to the terminal device, the cloud server can determine the number of times the mapping relationship has been recorded in the cloud voice library.

If the number of times of recording is equal to zero, the cloud server records the mapping relationship in the cloud voice library. For example, if the cloud server does not find the same mapping relationship by querying in the cloud voice library, it proves that the mapping relationship has not been recorded in the cloud voice library before, that is, the mapping relationship has not been used by the user or other users. At this time, the cloud server records the mapping relationship in the cloud voice library, so that next time there is the same mapping relationship, the cloud server can conveniently retrieve the number of times the mapping relationship has been recorded from the cloud voice library. If the number of times of recording is not equal to zero, the cloud server further compares the number of times of recording with a preset number of times. For example, if the cloud server finds the same mapping relationship by querying in the cloud voice library, it indicates that the same mapping relationship has been used by the user or other users. At this time, the number of times the mapping relationship has been recorded is obtained, and the record of this time is updated to the number of times of recording (that is, the number of times of recording is added by 1), which is then compared with the preset number of times. The preset number of times is preferably 10-30, and more preferably 20. Of course, the setting of the preset number of times may be adjusted by those skilled in the art based on different application scenes. In addition, before the number of times of recording is compared with the preset number of times, the recording of this time may be updated to the number of times of recording, or the comparison may be made directly without updating.

When the number of times of recording is larger than the preset number of times, it proves that the mapping relationship is used at a high frequency. At this time, the cloud server sends the mapping relationship to the terminal device, and the terminal device receives the mapping relationship and stores the mapping relationship in the local voice library, so that next time the user inputs the same voice information, the washing machine can directly find the corresponding control instruction by querying in the local voice library. When the number of times of recording is smaller than the preset number of times, it proves that the mapping relationship is used at a low frequency, and there is no need to send the mapping relationship to the terminal device at this time, so as to avoid the occupation of the storage space of the local voice library by too many mapping relationships.

Through the above setting, the washing machine of the present disclosure can also automatically update the local voice library based on the user's use habits, thus greatly improving the intelligence of the voice recognition function of the washing machine and further greatly improving the response speed of the terminal device and the user's use experience. In fact, due to the limited storage capacity of the local voice library, it cannot store a large number of mapping relationships like the cloud server. After applying the voice control method of the present disclosure, the local voice library always stores some mapping relationships that are most frequently used by user, so that the washing machine can be highly adapted to the user's use habits, which truly realizes an intelligent control of the washing machine.

It should be noted that the above preferred embodiments are only used to illustrate the principles of the present disclosure, and are not intended to limit the scope of protection of the present disclosure. Without departing from the principles of the present disclosure, those skilled in the art may adjust the above-mentioned setting so that the present disclosure can be applied to more specific application scenes.

For example, in an alternative embodiment, the cloud server may determine the number of times the mapping relationship has been recorded in the cloud voice library at the same time of or before sending the control instruction to the terminal device. Such changes to the sequence of steps do not deviate from the principles of the present disclosure, and therefore should fall within the scope of protection of the present disclosure.

For another example, in another alternative embodiment, when the number of times of recording is compared with the preset number of times, the number of times the mapping relationship has been recorded in the cloud voice library may be obtained first, and then the number of times of recording may be compared with the preset number of times. Then, if the number of times of recording is smaller than the preset number of times, it is further determined whether the number of times of recording is zero. Such changes to the sequence of steps do not deviate from the principles of the present disclosure, and therefore should fall within the scope of protection of the present disclosure.

Second Embodiment

Figure 2:
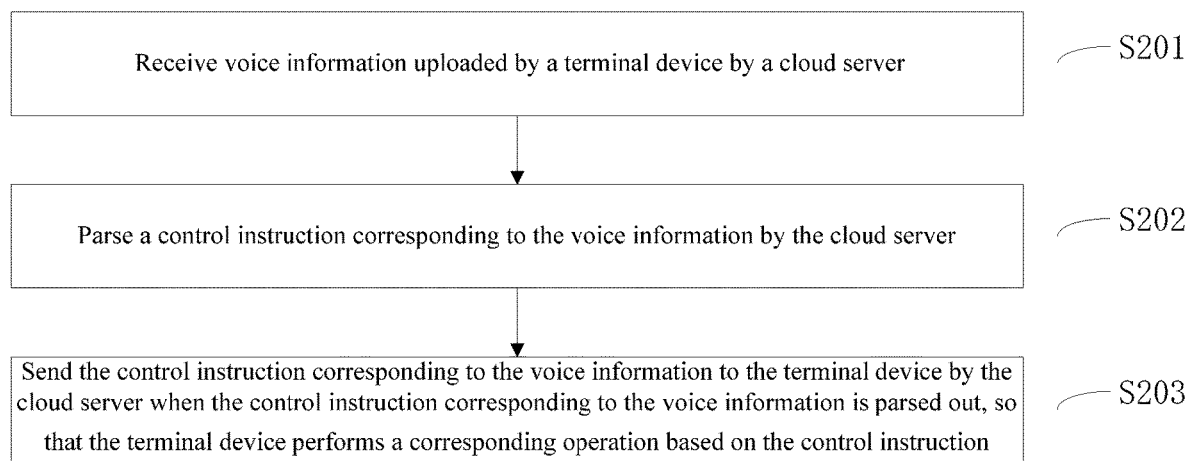
FIG. 2 is a flowchart of another embodiment of the voice control method of the present disclosure.

With reference to FIG. 2, a second embodiment of the voice control method of the present disclosure will be described. FIG. 2 is a flowchart of another embodiment of the voice control method of the present disclosure. An execution body of this method is a cloud server (hereinafter referred to as "cloud"). The settings of the washing machine and the cloud server involved in the following embodiment are the same as those of the first embodiment, and will not be described repeatedly herein.

As shown in FIG. 2, the voice control method of the present disclosure mainly includes the following steps:

S201: receiving, by a cloud server, voice information uploaded by a washing machine;

S202: parsing a control instruction corresponding to the voice information by the cloud server; and S203: sending the control instruction corresponding to the voice information to the washing machine by the cloud server when the control instruction corresponding to the voice information is parsed out, so that the washing machine performs a corresponding operation based on the control instruction; in which the washing machine uploads the voice information when the control instruction corresponding to the voice information cannot be found by querying in the local voice library.

The washing machine uploads the voice information to the cloud server when the control instruction corresponding to the voice information cannot be found by querying in the local voice library, so that the cloud server parses the voice information to obtain the corresponding control instruction and sends the control instruction to the washing machine, thus enabling the washing machine to perform a corresponding operation based on the control instruction. In this way, the voice control method of the present disclosure can improve the recognition accuracy rate of the washing machine, and avoid the problem of low accuracy rate of the washing machine when performing the recognition only through the limited mapping relationships in the local voice library, which greatly improves the user experience.

In order to further improve the user experience, as a preferred embodiment, after step S202, the voice control method of the present disclosure further includes:

determining, by the cloud server, the number of times a mapping relationship between the voice information and the control instruction has been recorded in a cloud voice library, when the control instruction corresponding to the voice information is parsed out; and recording, by the cloud server, the mapping relationship in the cloud voice library, if the number of times of recording is equal to zero; comparing, by the cloud server, the number of times of recording with a preset number of times, if the number of times of recording is not equal to zero; and sending, by the cloud server, the mapping relationship to the washing machine if the number of times of recording is larger than the preset number of times, so that the washing machine stores the mapping relationship in the local voice library.

The number of times the mapping relationship between the voice information and the corresponding control instruction has been recorded is determined by the cloud server, and when the number of times of recording is not equal to zero and is larger than the preset number of times, the corresponding mapping relationship is sent to the washing machine, so that the washing machine stores the mapping relationship in the local voice library. In this way, the voice control method of the present disclosure also enables the washing machine to automatically update the local voice library in the washing machine based on the user's use habits, so that the intelligence of the voice recognition function of the washing machine is greatly improved, thereby further improving the response speed of the washing machine and the user's use experience.

Third Embodiment

Figure 3:
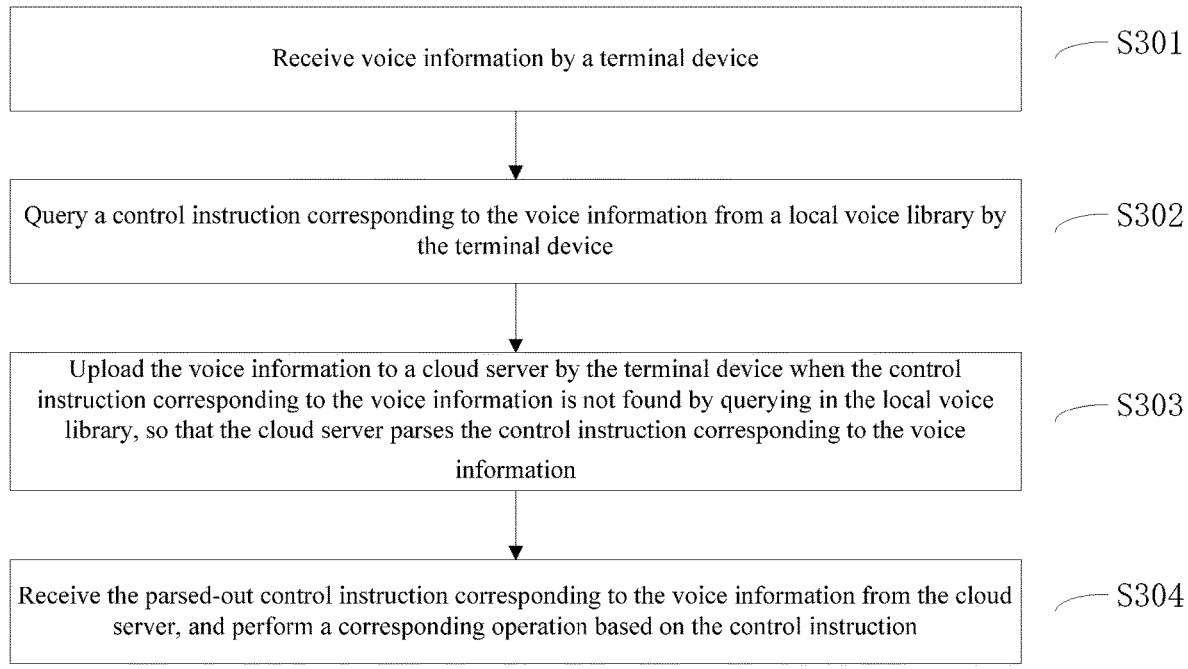
FIG. 3 is a flowchart of yet another embodiment of the voice control method of the present disclosure.

With reference to FIG. 3, a third embodiment of the voice control method of the present disclosure will be described. FIG. 3 is a flowchart of yet another embodiment of the voice control method of the present disclosure. An execution body of this method is a washing machine. The settings of the washing machine and the cloud server (hereinafter referred to as "cloud") involved in the following embodiment are the same as those of the first embodiment, and will not be described repeatedly herein.

As shown in FIG. 3, the voice control method of the present disclosure mainly includes the following steps:

S301: receiving voice information by a washing machine;

S302: querying a control instruction corresponding to the voice information from a local voice library by the washing machine;

S303: uploading the voice information to a cloud server by the washing machine, when the control instruction corresponding to the voice information is not found by querying in the local voice library, so that the cloud server parses the control instruction corresponding to the voice information; and S304: receiving the parsed-out control instruction corresponding to the voice information from the cloud server by the washing machine, and performing a corresponding operation by the washing machine based on the control instruction.

After the washing machine receives the voice information, it first queries the control instruction in the local voice library. If the corresponding control instruction is found by querying in the local voice library, the corresponding operation is performed according to the control instruction. The voice control method of the present disclosure enables the operation of the washing machine to be performed quickly and leads to a good user experience. When the control instruction corresponding to the voice information cannot be found by querying in the local voice library, the voice information is uploaded to the cloud server so that the cloud server can parse the voice information to obtain the corresponding control instruction; then the washing machine receives the parsed-out control instruction corresponding to the voice information and performs a corresponding operation based on the control instruction. The voice control method of the present disclosure can also improve the recognition accuracy rate of the washing machine through the parsing of the cloud server in a case where the voice information cannot be recognized locally, and avoid the problem of low accuracy rate of the washing machine when performing the recognition only through the limited mapping relationships in the local voice library, which greatly improves the user experience.

In order to further improve the user experience, as a preferred embodiment, after step S303, the voice control method of the present disclosure further includes:

receiving a mapping relationship between the voice information and the control instruction from the cloud server by the washing machine, and storing the mapping relationship in the local voice library by the washing machine; in which when the cloud server has parsed out the control instruction corresponding to the voice information, the cloud server determines the number of times the mapping relationship between the voice information and the control instruction has been recorded in the cloud voice library; and the mapping relationship is sent by the cloud server when the number of times of recording is not equal to zero and is larger than a preset number of times.

When the control instruction corresponding to the voice information is parsed out by the cloud server, the number of times the mapping relationship between the voice information and the corresponding control instruction has been recorded in the cloud voice library is determined, and when the number of times of recording is not equal to zero and is larger than the preset number of times, the corresponding mapping relationship is sent to the washing machine, so that the washing machine receives the mapping relationship and stores it in the local voice library. In this way, the voice control method of the present disclosure also enables the washing machine to automatically update the local voice library in the washing machine based on the user's use habits, so that the intelligence of the voice recognition function of the washing machine is greatly improved, thereby further improving the response speed of the washing machine and the user's use experience.

In addition, the present disclosure also provides a cloud server which includes a memory, a processor, and a computer program, in which the memory is connected to the processor, and the computer program is stored in the memory and is configured to be loaded by the processor to perform the voice control method described in the second embodiment.

In addition, the present disclosure also provides a washing machine which includes a memory, a processor, and a computer program, in which the memory is connected to the processor, and the computer program is stored in the memory and is configured to be loaded by the processor to perform the voice control method described in the third embodiment.

Figure 4:
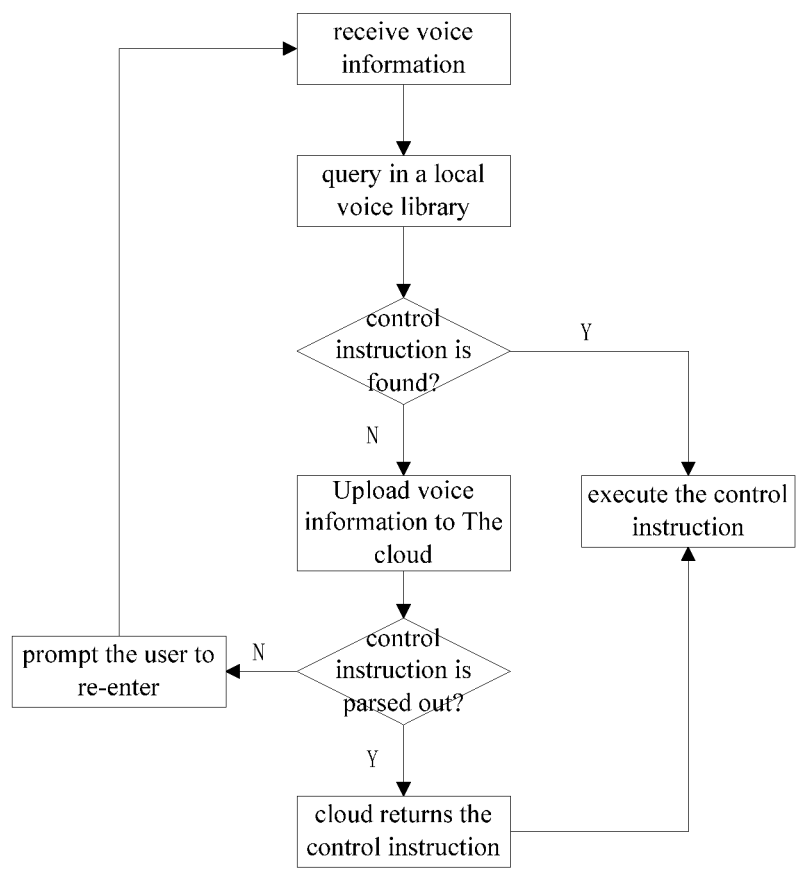
FIG. 4 is a logic diagram of an embodiment of the voice control method of the present disclosure.
Figure 5:
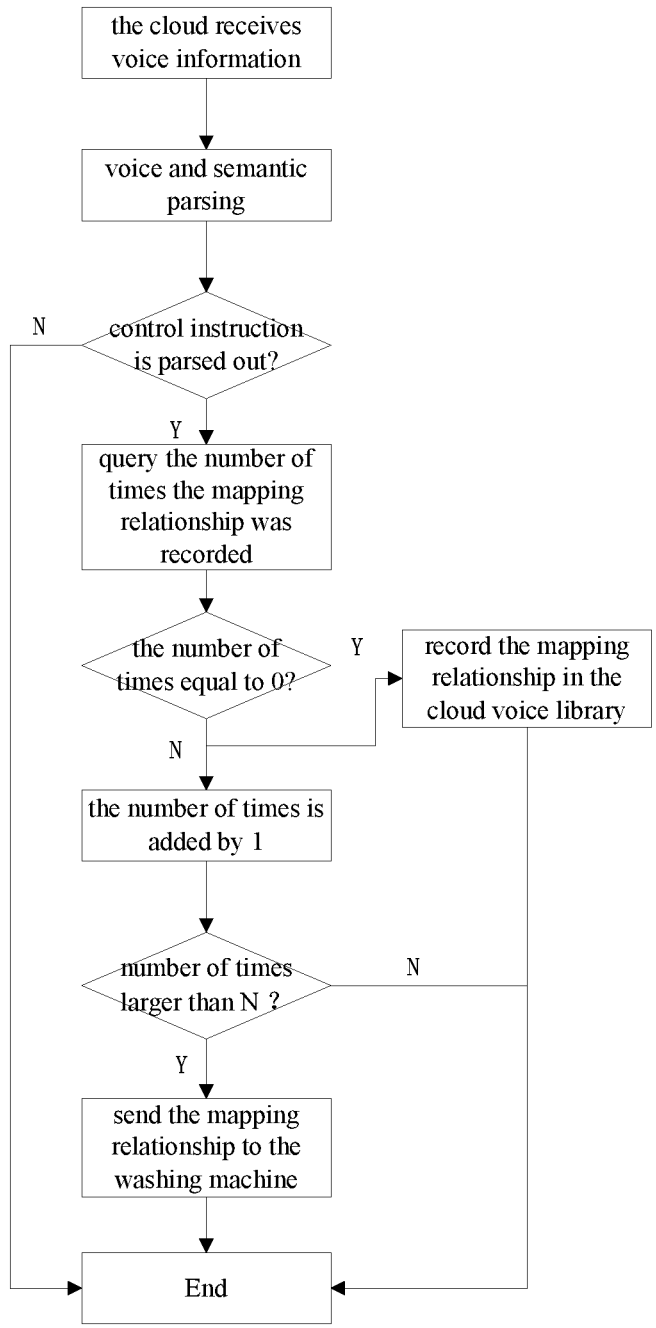
FIG. 5 is a logic diagram of another embodiment of the voice control method of the present disclosure.

With reference to FIGS. 4 and 5, a control process of the control method of the present disclosure will be described below. FIG. 4 is a logic diagram of an embodiment of the voice control method of the present disclosure; and FIG. 5 is a logic diagram of another embodiment of the voice control method of the present disclosure.

First, referring to FIG. 4, in a possible embodiment, the washing machine receives voice information from the user, and the voice recognition module queries the corresponding control instruction in the local voice library based on the voice information; when the control instruction corresponding to the voice information is found by querying in the local voice library, the voice recognition module sends the control instruction to the control module, and the control module controls the washing machine to perform a corresponding operation based on the control instruction; and when the control instruction corresponding to the voice information is not found by querying, the washing machine uploads the voice information to the cloud wirelessly, and the cloud server parses the voice information. If the control instruction corresponding to the voice information is successfully parsed out, the control instruction is returned to the control module of the washing machine, so that the control module of the washing machine controls the washing machine to perform a corresponding operation based on the control instruction; and if the cloud server fails to successfully parse out the control instruction corresponding to the voice information, a failure instruction is returned to the control module of the washing machine, so that the control module controls the washing machine to send a prompt sound to prompt the user to re-enter the voice information.

Next, referring to FIG. 5, in another possible embodiment, the cloud parses the voice information after receiving the voice information uploaded by the washing machine. If the instruction corresponding to the voice information is not parsed out, the command is ended; and if the corresponding control instruction is parsed out, the number of times the mapping relationship between the voice information and the control instruction has been recorded in the cloud voice library is further queried; if the number of times of recording is equal to zero, the mapping relationship is recorded in the cloud voice library; and if the number of times of recording is not equal to zero, the number of times of recording is updated (that is, the number of times of recording is added by 1), and it is judged whether the number of times of recording is larger than N; if the number of times of recording is not larger than N, the command is ended; and if the number of times of recording is larger than N, the mapping relationship is sent to the washing machine.

Hitherto, the preferred embodiments of the present disclosure have been described in conjunction with the accompanying drawings, but it is easily understood by those skilled in the art that the scope of protection of the present disclosure is obviously not limited to these specific embodiments. Without departing from the principles of the present disclosure, those skilled in the art can make equivalent changes or replacements to relevant technical features, and all the technical solutions after these changes or replacements will fall within the scope of protection of the present disclosure.

What is claimed is:

1. A voice control method, comprising:
   receiving voice information by a terminal device;
   querying a control instruction corresponding to the voice information from a local voice library by the terminal device;
   uploading the voice information to a cloud server by the terminal device when the control instruction corresponding to the voice information is not found by querying in the local voice library, wherein a cloud voice library is stored in the cloud server, and the cloud voice library stores mapping relationships between voice information and control instructions;
   parsing the control instruction corresponding to the uploaded voice information by the cloud server;
   finding, by the cloud server, whether there is a mapping relationship same as the mapping relationship between the uploaded voice information and the control instruction which is parsed out, by querying in the cloud voice library;
   recording, by the cloud server, the mapping relationship between the uploaded voice information and the control instruction which is parsed out in the cloud voice library, when the cloud server does not find the same mapping relationship by querying in the cloud voice library;
   sending the control instruction corresponding to the voice information to the terminal device by the cloud server, when the control instruction corresponding to the voice information is parsed out; and
   receiving the control instruction by the terminal device, and performing a corresponding operation by the terminal device based on the control instruction,
   wherein after parsing the control instruction corresponding to the uploaded voice information by the cloud server, the method further comprises:
   determining, by the cloud server, the number of times the mapping relationship between the voice information and the control instruction has been recorded in the cloud voice library, when the control instruction corresponding to the voice information is parsed out;
   comparing, by the cloud server, the number of times of recording with a preset number of times, if the number of times of recording is not equal to zero;
   sending, by the cloud server, the mapping relationship to the terminal device if the number of times of recording is larger than the preset number of times; and
   receiving the mapping relationship by the terminal device, and storing the mapping relationship in the local voice library by the terminal device.

2. A voice control method, comprising:
receiving, by a cloud server, voice information uploaded by a terminal device, wherein a cloud voice library is stored in the cloud server, and the cloud voice library stores mapping relationships between voice information and control instructions;
parsing a control instruction corresponding to the uploaded voice information by the cloud server;
finding, by the cloud server, whether there is a mapping relationship same as the mapping relationship between the uploaded voice information and the control instruction which is parsed out, by querying in the cloud voice library;
recording, by the cloud server, the mapping relationship between the uploaded voice information and the control instruction which is parsed out in the cloud voice library, when the cloud server does not find the same mapping relationship by querying in the cloud voice library;
sending the control instruction corresponding to the voice information to the terminal device by the cloud server when the control instruction corresponding to the voice information is parsed out, so that the terminal device performs a corresponding operation based on the control instruction;
after parsing the control instruction corresponding to the uploaded voice information by the cloud server, the method further comprises:
determining, by the cloud server, the number of times a mapping relationship between the voice information and the control instruction has been recorded in a cloud voice library, when the control instruction corresponding to the voice information is parsed out;
comparing, by the cloud server, the number of times of recording with a preset number of times, if the number of times of recording is not equal to zero; and
sending, by the cloud server, the mapping relationship to the terminal device if the number of times of recording is larger than the preset number of times, so that the terminal device stores the mapping relationship in a local voice library,
wherein the terminal device uploads the voice information when the control instruction corresponding to the voice information cannot be found by querying in the local voice library.

3. A voice control method, comprising:
receiving voice information by a terminal device;
querying a control instruction corresponding to the voice information from a local voice library by the terminal device;
uploading the voice information to a cloud server by the terminal device, when the control instruction corresponding to the voice information is not found by querying in the local voice library, so that the cloud server parses the control instruction corresponding to the voice information;
receiving the parsed-out control instruction corresponding to the voice information from the cloud server by the terminal device, and performing a corresponding operation by the terminal device based on the control instruction;
after the uploading of the voice information to the cloud server by the terminal device, the method further comprises:
receiving a mapping relationship between the voice information and the control instruction from the cloud server by the terminal device, and storing the mapping relationship in the local voice library by the terminal device;
wherein when the cloud server has parsed out the control instruction corresponding to the uploaded voice information, the cloud server is configured to
find whether there is a mapping relationship same as the mapping relationship between the uploaded voice information and the control instruction which is parsed out, by querying in a cloud voice library;
determine the number of times the mapping relationship between the voice information and the control instruction has been recorded in a cloud voice library;
compare the number of times of recording with a preset number of times, if the number of times of recording is not equal to zero; and
send the mapping relationship to the terminal device if the number of times of recording is larger than the preset number of times, so that the terminal device stores the mapping relationship in the local voice library.

* * * * *